March 14, 1967     K. DEBUS ET AL     3,308,932
METHOD AND APPARATUS FOR CONTROLLING A LINE CASTING MACHINE
Filed Sept. 27, 1965     6 Sheets-Sheet 1

INVENTORS
KARL DEBUS
LEON STARK
By:

March 14, 1967 K. DEBUS ET AL 3,308,932
METHOD AND APPARATUS FOR CONTROLLING A LINE CASTING MACHINE
Filed Sept. 27, 1965 6 Sheets-Sheet 3
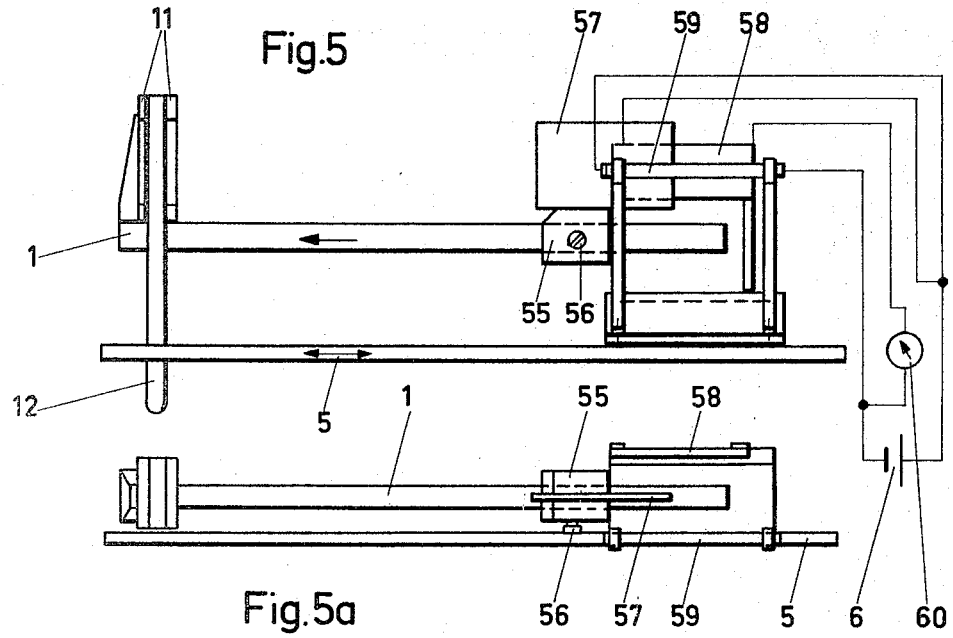
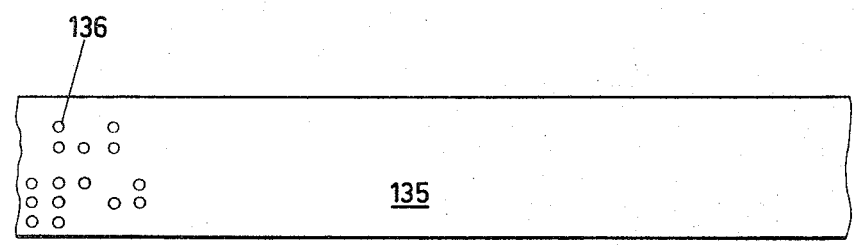
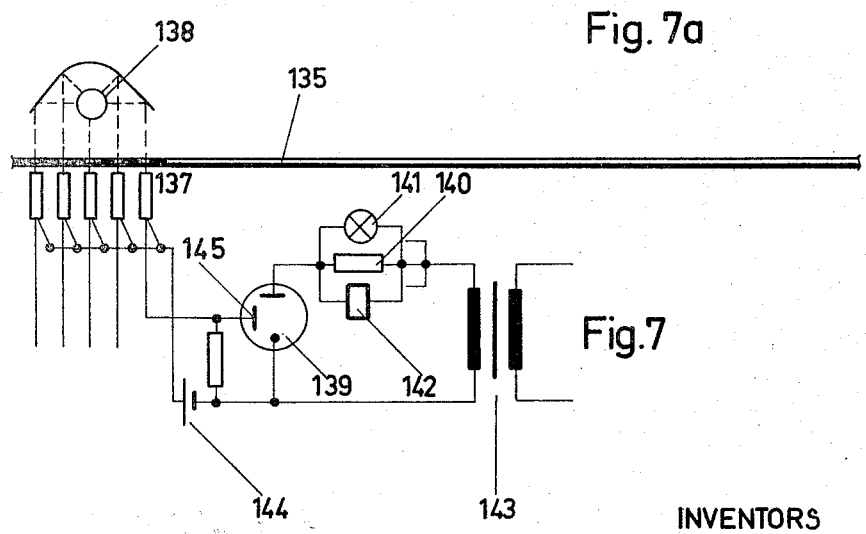
INVENTORS
KARL DEBUS
LEON STARK
By: Michael S. Striker
Attorney

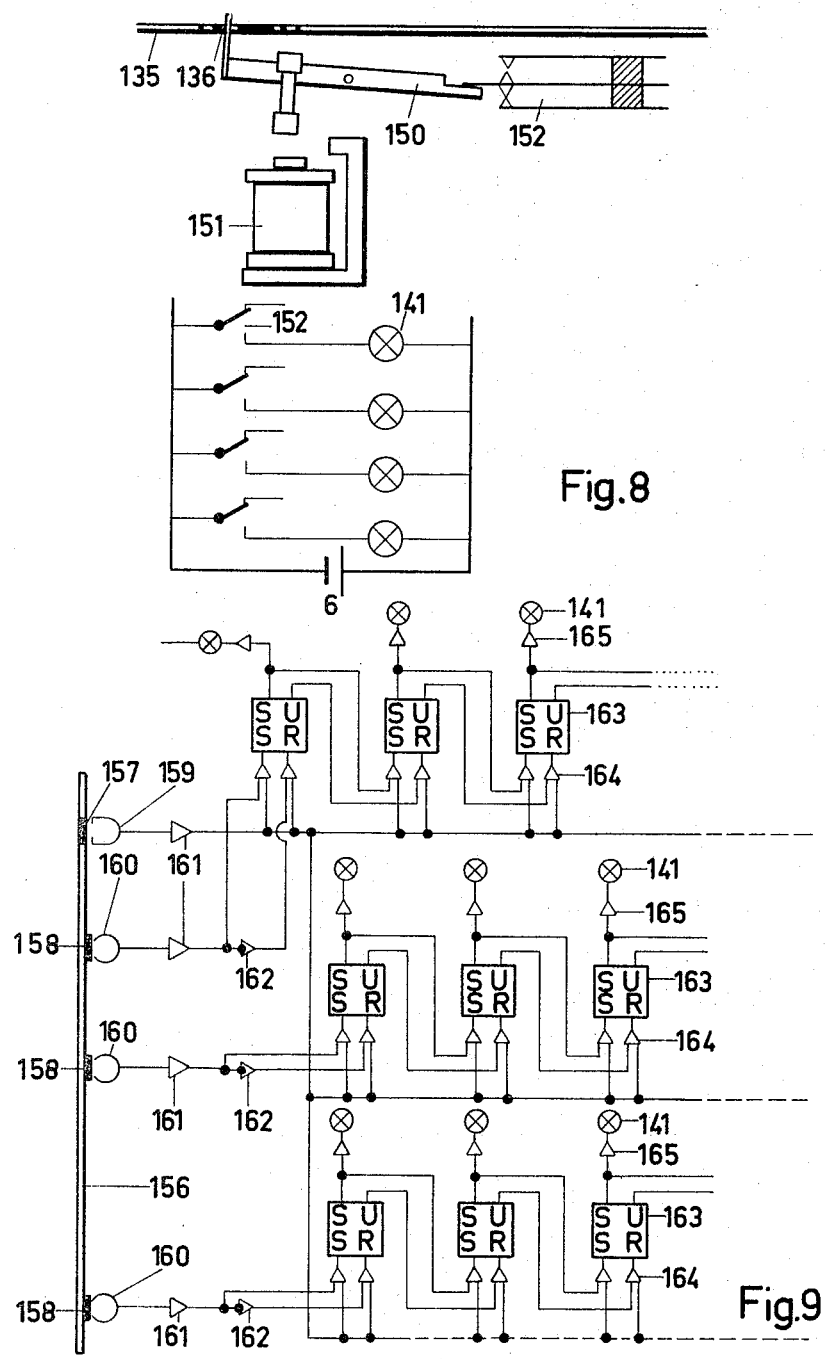

March 14, 1967  K. DEBUS ET AL  3,308,932
METHOD AND APPARATUS FOR CONTROLLING A LINE CASTING MACHINE
Filed Sept. 27, 1965  6 Sheets-Sheet 6

INVENTORS
KARL DEBUS
LEON STARK
By:

United States Patent Office

3,308,932
Patented Mar. 14, 1967

3,308,932
METHOD AND APPARATUS FOR CONTROLLING A LINE CASTING MACHINE
Karl Debus, Bad Homburg, and Leon Starck, Frankfurt am Main, Fechenheim, Germany, assignors to Linotype G.m.b.H., Frankfurt am Main, Germany
Filed Sept. 27, 1965, Ser. No. 490,492
Claims priority, application Germany, Sept. 29, 1964, L 48,888
37 Claims. (Cl. 199—18)

The present invention relates to a method and apparatus for controlling a line casting machine, such as a "Linotype" machine, and more particularly to apparatus for controlling the discharge of matrices from the magazines into the assembler slide partly automatically, and partly under manual control, permitting the operator to determine the end of a line.

It is known to use record carriers, and more particularly punched tapes for controlling line casting machines. The tape has coded recordings in the form of punched holes which relate to the matrices and space bands, and for an automatic operation, it is also necessary to provide recordings indicating the end of a line, and such recording cause a signal which effects operation of the assembling elevator so that the assembler slide with all matrices of a completed line is raised toward the mold disk.

Since the number of matrices required for a line depends on the length of the line, the particular font, the point size, and the width of the selected matrices, the tapes are punched on special perforators which include in addition to the punches, also a counter in which the widths of the matrices and of the space bands are added.

Electronic computers are used for this operation and replace a great number of skilled operators due to the extremely high operating speed of the automatic operation.

The computer is controlled either by record carriers which are punched by punches under control of the same keyboard which operates a typewriter on which a text is typed at a newspaper office, or the machine may be operated by remote control by signals produced at a news agency.

In such a situation, the source of information does not know the exact length of a line to be cast, and consequently the signals do not include an end signal indicating the end of a line, and causing the transport of the assembled line to another position to be cast, and the start of the assembly of a new line of matrices.

Particularly, if the line casting machine is used for printing a newspaper, it is of paramount importance that the cast is ready at a certain deadline, and information arriving late without signals indicating the ends of the lines cannot be used for automatically controlling the assembly of matrices.

A similar difficulty is caused if a tape contains recordings indicating the end of a line, and the tape is to be used for controlling the assembly of a line having a different length, or different font, size, or width.

It is the object of the invention to overcome the above described difficulties, and to control a line casting machine by tapes having either no recordings indicating the end of a line, or recordings indicating the end of a line at an undesired place.

Another object of the invention is to provide a method for controlling discharge of the matrices of a line casting machine into an assembler slide partly automatically, and partly manually.

Another object of the invention is to provide an apparatus for controlling the discharge of the matrices of a line casting machine into the assembler slide which automatically switches the machine from automatic control to manual control.

Another object of the invention is to automatically move the control tape of a line casting machine to a selected position, and to manually control the movement of the tape from the selected position to an end position in which a line end signal is given by the operator.

Another object of the invention is to provide manually controlled means for causing discharge of a matrix representing a hyphen if a word cannot be completed at the end of a line.

With these objects in view, the present invention provides an improved method and apparatus for controlling the discharge of matrices in a line casting machine at the end of a line when the controlling record carrier has no recordings indicating the end of a line, or has recordings indicating the end of lines at wrong places.

One method of the invention comprises means automatically driving a record carrier, such as a punched tape; automatically sensing recordings to control the release of matrices and space bands accordingly; automatically stopping the record carrier when the end of the assembled series of matrices and space bands, if any, is located at a selected distance from the end of a predetermined line length; manually controlling the record carrier to move stepwise and thereby controlling the machine to continue assembling operation; and manually causing an end signal causing the delivery of the assembled line to another part of the machine. When the last character of the predetermined line does not occur at the end of a word, the operator releases a matrix representing a hyphen.

An apparatus according to the invention comprises switch means actuated by the assembler slide of the line casting machine in a predetermined intermediate position spaced from the end position in which the complete line of matrices is assembled, and being connected with the means by which the record carrier is moved to stop the sensing of the record carrier. First manually controlled means are used for moving the record carrier beyond the intermediate position so that additional recordings are sensed and additional matrices discharged into the assembler slide, and second manually controlled means are provided for starting the operation of the assembling elevator when the recording representing the last character of a line determined by the operator has been sensed.

Indicating means showing the space taken up by assembled matrices and space bands, and the drive or expansibility of the space bands, are provided so that the operator can determine when the signal representing the end of the line must be given.

If the record carrying tape has a punched recording representing a wrong end signal which cannot be used for the particular column length of the text to be printed, it is rendered ineffective, while a recording incidentally correctly indicating the end of the line is maintained.

When a justifiable line of matrices has been assembled, and the next following recording indicates a space band, this recording is used for causing in a preferably automatic operation, the production of the end signal indicating the completion of a line.

Some recording tapes contain type setting instructions, such as the quadding justification commands "right," "left," and "center," and these recordings can be also used to have the effect of end signals indicating the completion of an assembled line. When existent recordings of a tape are used in this manner for producing the end signal, manual operations are saved in an advantageous manner.

If a record carrier has recordings corresponding to a line having a different length than the line which is to be cast, a recording representing a hyphen indicating that a word has to be divided, may be provided at the end of the line for which the tape was designed, and this hyphen recording cannot be used for controlling the machine. It is preferred to automatically stop the machine operations when a hyphen indicating a divided word is representetd by a recording on the record carrier. This has the advantage that the operator can check whether the hyphen fits into the line which is being cast, or whether it should be omitted.

It is particularly advantageous to suppress a "hyphen" command only if an end signal command follows directly behind it. If the hyphen command is automatically rendered ineffective when followed by an end signal command, the operator need not check the position of any occurring hyphen recording.

If a recording indicating an end signal, which does not follow directly a recording indicating the hyphen signal, occurs at a wrong place, it is preferably automatically used to produce the command signal causing the discharge of a space band. In this manner, commands which are not actually recorded on an existent record carrier, can be given under the control of recordings associated with wrong commands on the existent tape.

This feature of the invention can be further improved by causing the substitute command, such as the discharge of a space band, only if the respective line is not yet justifiable. In this manner it is assured that the end signal, causing the raising of the assembler slide, is only effective when the assembled line is justifiable in a particular composition of a printed page.

It is advantageous to provide indicating means which visually indicate decoded information contained in a selected number of recordings following the last sensed recording of the record carrier. In this manner, the operator recognizes the justifiability of the line before the start of the stepwise sensing of the record carrier, so that the stepwise sensing can be accelerated.

In the preferred embodiment of the invention, the assembler slide operates a switch which stops the transport of the record carrier in a predetermined position of the assembler slide, which can be selected by adjusting the position of the switch in relation to the assembler slide. A manually operated key switch is provided which upon operation causes again a stepwise movement of the record carrier. Every time this key is operated, the record carrier moves a single step so that even if the key is held depressed for a long time, only a single matrix is discharged into the assembler slide.

Indicating means are provided which indicate the condition of the assembled line of matrices, and the expansibility of the space bands already assembled so that the operator is aware to what extent the line is assembled. Preferably, a signal is automatically given when the line has become justifiable with the space bands already assembled. It is preferred to arrange the electric circuit in such a manner that the end signal, causing the operation of the assembling elevator, can only be given if the justifiability of the assembled line was indicated.

It is advantageous to provide means which prevent the discharge of a space band after the justifiability of a composed line of matrices has been indicated. This condition is preferably indicated by a particular signal.

It is preferred to provide means which when the justifiability of the composed line of matrices is indicated by a signal, respond to a recording representing a space band to automatically cause the production of the end signal which causes the actuation of the assembling elevator and the removal of the line of matrices assembled at that moment in the assembler slide. Consequently, the operator may participate in the assembly of the matrices only if a matrix representing a hyphen must be provided at the end of the line if a word cannot be completed.

The apparatus of the invention comprises means which render a "hyphen" command effective only if directly followed by an end signal, and means which cause the discharge of a "hyphen" matrix if a "hyphen" command is directly followed by a space band recording.

This device can be advantageously improved by a storage means for the "hyphen" commands. Means are provided which, if no "hyphen" is stored, cause the discharge of a space band by an end signal. However, the discharge takes place only if the line is not justifiable, and if the signal, indicating the justifiability of the line, is not stored.

It is preferred to provide optical indicators controlled by the sensing means of the record carrier to represent the sensed recording in decoded form.

However, this indicator can be advantageously replaced by another device. This device includes in addition to the sensing means controlling the discharge of matrices, another sensing means leading the same relative to the record carrier, and sensing recordings which are then stored in a storing device which is provided with an optical indicator showing a predetermined number of indications representing a corresponding number of sensed recordings. This device is particularly advantageous if the spaces between successive coded recordings on the record carrier are too small to permit the provision of a sensing means for each step of the record carrier.

Either the coded recording, or the decoded recording in the form of symbols or characters may be indicated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a front elevation, and partially an electric diagram illustrating a photoelectric indicator indicating the degree to which a line has been composed of matrices;

FIG. 5a is a plan view of the device shown in FIG. 5;

FIG. 7a is a fragmentary plan view illustrating a record carrying tape provided with coded recordings;

FIG. 7 is a schematic elevation illustrating a photoelectric sensing means for the record carrier;

FIG. 8 is partly a side elevation, and partly an electric diagram illustrating another sensing device;

FIG. 9 is a diagram illustrating the circuit of a combined sensing and storing device including means for indicating the sensed recordings;

Figure 1:
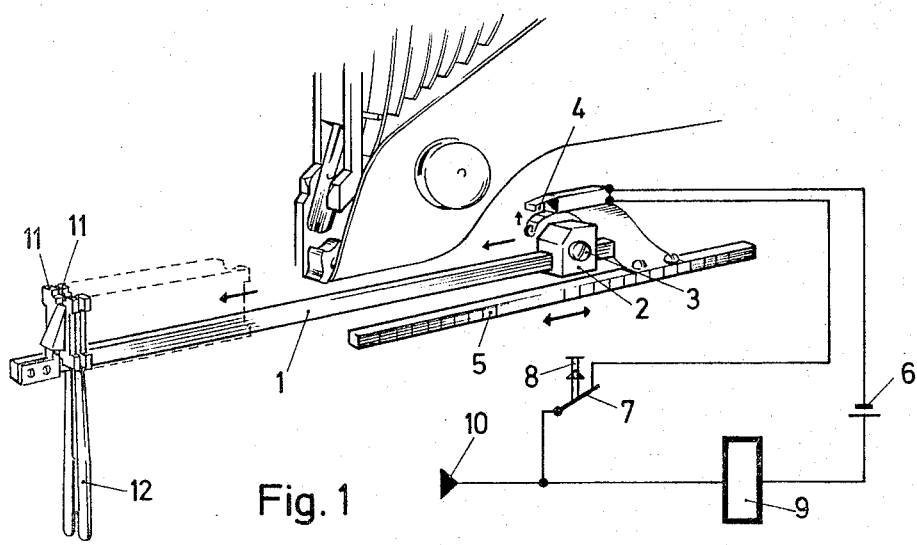
FIG. 1 is a fragmentary perspective view, and partially a circuit diagram illustrating an apparatus according to the invention, the standard parts of a line casting machine being omitted for the sake of simplicity.

The devices illustrated in the drawing are part of a conventional line casting machine, particularly of a "Linotype" machine of standard construction which is well known and described, for example, in the Official Manual of the Mergenthaler Linotype Co., Brooklyn, N.Y., entitled, "Linotype Machine Principles," Copyright 1940. A Linotype machine is also described in the "Linotype-Instruktionsbuch," published by the Linotype G.m.b.H. in 1961 in Berlin and Frankfurt am Main.

In view of the fact that a line casting machine with which the present invention is concerned is disclosed in greatest details in the above publications, the drawing of the present application shows only parts improved in accordance with the invention.

Figure 2:
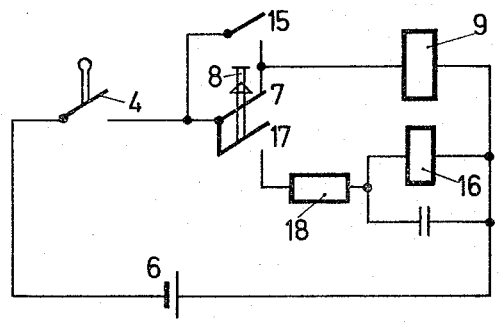
FIG. 2 is a diagram illustrating the circuit of the device of FIG. 1 in greater detail.
Figure 3:
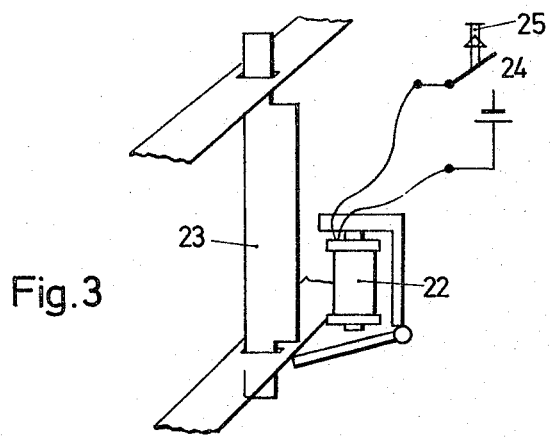
FIG. 3 is a fragmentary perspective view illustrating a device for causing discharge of matrices from the magazines of the line casting machine, and being particularly used for controlling discharge of "hyphen" matrices and of space bands.

Referring now to the drawings, and more particularly to FIGS. 1 and 2, the assembler slide 1 carries an actuator slide 2 which can be adjusted along the length of slide 1 to different positions, and secured in adjusted positions by a screw 3. By operation of the device as shown in FIG. 3, matrices are discharged from the magazines of the machine, and guided by guide chutes shown in thin lines in FIG. 1 into the assembler slide which is pushed back by each matrix so that actuator slide 2 moves along the graduated scale 5 until reaching a position in which actuator slide 2 engages and closes a switch 4. A switch 7, manually operated by a key 8, is connected in series with switch 4, with a source of voltage 6, and with a locking magnet means 9 which is energized when switch 4 is closed and causes stopping of the operation of the line casting machine, in the same manner as if a disturbance had happened, which would cause signals arriving from line 10 and being supplied to the locking magnet means 9 to stop the machine. More particularly, energization of locking magnet means 9 causes stopping of the sensing of the record carrying tape by which the machine and the discharge of the matrices are controlled.

Switch 4 is carried by the bar which has the graduated scale 5, and the position of switch 4 is selected in accordance with the desired and predetermined length of a line. As the record carrier tape is stepwise sensed in an automatic operation and matrices are supplied to the assembler slide, the same moves to the left as viewed in FIG. 1 and actuator slide 2 moves therewith until engaging switch 4 in an intermediate position of assembler slide 1 which is still spaced from the end position of assembler slide 1 in which all matrices and space bands sufficient for the predetermined length of the desired line are composed and assembled. How far the intermediate position is spaced from the end position of the slide, is determined by adjusting the position of the actuator slide 2. Until switch 4 is closed in the intermediate position of the assembler slide, the composing of the line takes place in an automatic operation controlled by the motor transported record carrier tape, but when switch 4 is closed, the transport of the tape is stopped by locking magnet means 9, and the remainder of the line is assembled by manually controlling the stepwise movement of the record carrier tape while the same is being sensed.

When the normally closed switch 7 is manually opened, the locking magnet means 9 is de-engergized.

Figure 6:
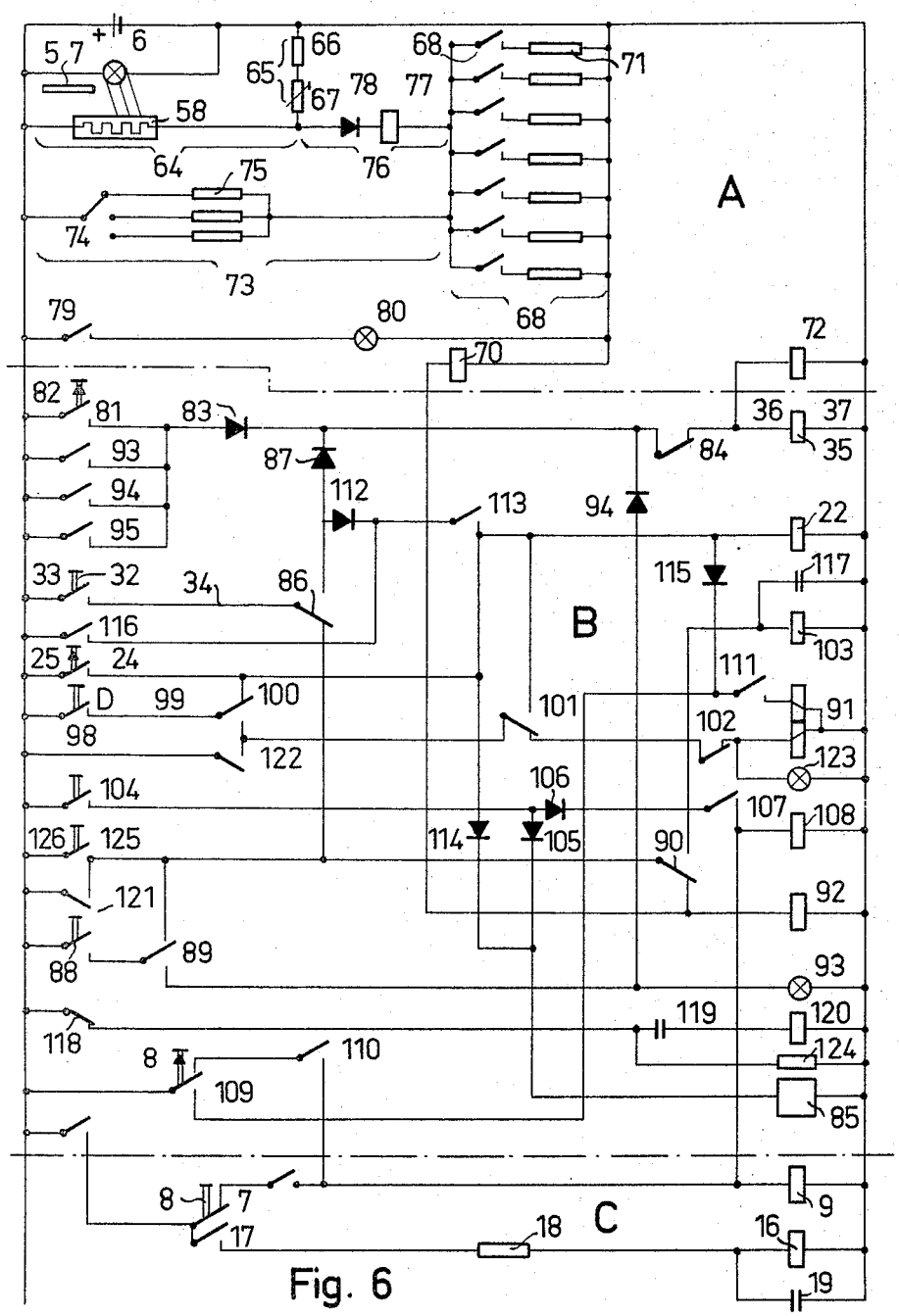
FIG. 6 is a diagram illustrating the electric circuit of a preferred embodiment of the invention, and including a first circuit A for the device shown in FIG. 5, a second circuit B for the device shown in FIG. 4, and a third circuit C for the device shown in FIG. 1, and partly corresponding to the circuit of FIG. 2.

The circuit of FIG. 1 is shown in greater detail in FIG. 2, and in portion C of the circuit diagram of FIG. 6. Key 8 operates not only switch 7, but also a switch 17 connected in series with a resistor 18. A relay 16 and a capacitor 19 are connected in parallel to each other, and in series with resistor 18. Relay 16 is energized with a delay caused by resistor 18 and capacitor 19 when switch 17 is manually closed. A contact 15 is connected in parallel with switch 7, and is operated by relay 16 when the same is energized. When switch 15 closes, locking magnet means 9 is again energized.

After switch 4 has been closed and locking magnet means energized, the operator presses key 8, opens switch 7, and closes switch 17. Switch 7 de-energizes locking magnet means so that the record carrier tape is driven to the next following sensing position in which relay 16 is energized after a delay caused by resistor 18 and capacitor 19 to close relay contact 15 whereby locking magnet means 9 is again energized and stops the transport of the record carrier tape.

When a recording has been sensed in this position, and the corresponding matrix discharged from the magazine slides through the chute onto the assembler slide, the operator again actuates key 18, so that locking maguet means is again de-energized, permitting the tape to move to the next following sensing position where contact 15 again energizes locking magnet means 9 to stop the tape. Release of key 8 after depression of the same, will cause return of switches 7 and 17 to the illustrated position, and energization of locking magnet means 9. In this manner, the record carrier tape is stepwise advanced whenever the key 8 is manually operated.

Figure 4:
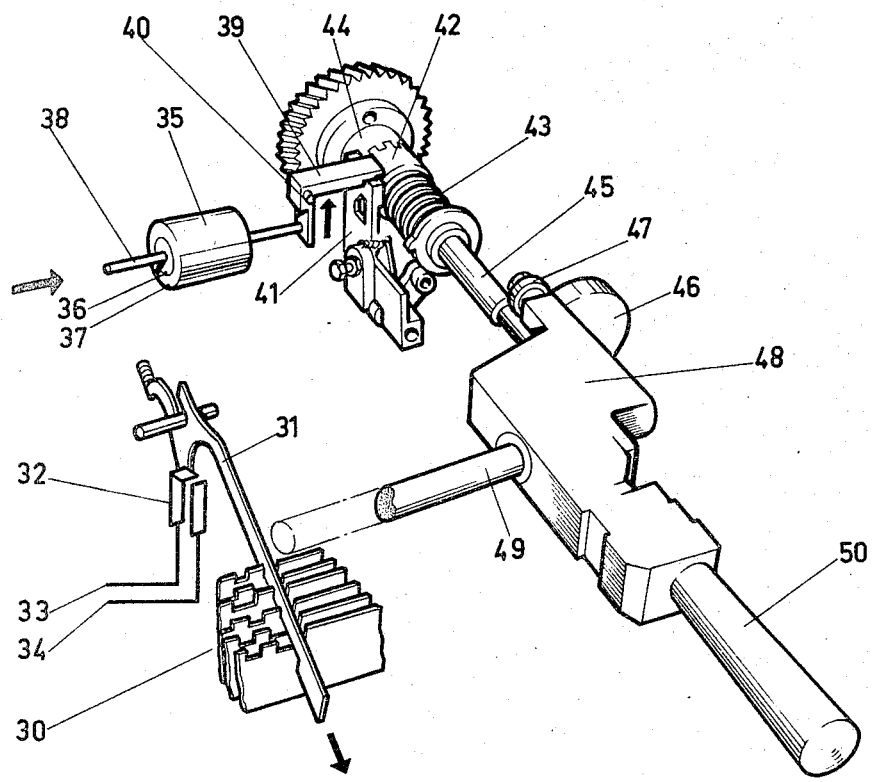
FIG. 4 is a fragmentary perspective view illustrating a device for either automatically or manually causing an end signal indicating the end of a composed line, and effecting movement of the assembler slide with the assembled line to another position.

When the end of the line is reached, and all matrices and space bands necessary for the justification of a line are assembled on the assembler slide 1, lever 50, shown in FIG. 4, is actuated by the operator which causes movement of the assembler slide 1 by the assembling elevator to another position in the region of the mold disk. However, if the last matrix of the line assembled on assembler slide 1 does not represent a character at the end of a word, the operator actuates a key which causes discharge of a matrix representing a hyphen which is also assembled as the last matrix of the line assembled on assembler slide 1.

Standard escapements control the magazines which store the matrices, space bands, and particularly the "hyphen" matrices, and are controlled in the usual manner by keys on a keyboard. As shown in FIG. 3, a key 25 closes a switch 24 by which a source of voltage 6 is connected with the solenoid of an electromagnet 22 whose armature raises the bar 23 by which the escapement mechanism of the respective magazine is operated in the usual manner. It will be understood that a device as shown in FIG. 3 is provided for each magazine channel which stores a great number of the same matrices.

FIG. 4 illustrates a device by which a command signal is produced at the end of a line for the purpose of causing movement of assembler slide 1 by the assembling elevator to a higher position in the region of the mold disk. A set of key bars 30 has projections and recesses which permit the dropping of an actuator bar 31 only in a particular relative position of key bar 30 which the same assume when the sensing means sense a coded recording on the record carrier tape indicating the end of a line. This arrangement is provided in standard line casting machines. When actuator bar 31 drops into the aligned slot of key bars 30, it automatically moves in longitudinal direction, as indicated by an arrow in FIG. 4, and closes a switch 32 which is connected by conductors 33, 34 to terminals 36, 37 of an electromagnetic actuator 35 whose armature 38 is connected to a releasing member 39 pivotally mounted on a pin 40 and releasing a spring biased member 41 which releases a spring-loaded coupling member 42 urged by a spring 43 into coupling engagement with a continuously rotating driven coupling part 44 whereby actuator shaft 45 starts to rotate and turns a cam 46 thereon to a position raising by means of a cam follower roller 47, the elevator lever 48. Elevator lever 48, which can also be manually turned by handle 50, turns shaft 49 which is connected by linkages, not shown, to the assembling elevator which is actuated by shaft 49 to raise assembler slide 1 with the assembled line to a position located in the region of the mold disk.

Since actuator bar responds to the displacement of key bars 30 under the control of an end signal produced by a recording on a record carrier, a recording indicating the end of the line will cause actuation of the assembling elevator in the usual operations of the line casting machine. If the record carrier tape has no recording indicating the end of the line, and if the apparatus described with reference to FIGS. 1 and 2 is used in accordance with the invention, manual actuation of elevator lever 48, 50 by the operator will actuate the assembling elevator after the assembly of the line has been completed.

In order to determine that sufficient matrices and space bands have been assembled on the assembler slide to form a justifiable line, indicator means are used which indicate the space taken up by the partly assembled matrices.

A photoelectric indicator is shown in FIGS. 5 and 5a which may be used in addition to the device shown in FIG. 1, or instead of the same. The assembler slide 1 carries a block 55 which can be adjusted along the length of the assembler slide, and secured in a selected position by a screw 56. A shield 57 is carried by block 55 and moves with assembler slide 1 as the assembly of the matrices progresses. A source of light 59 is arranged on one side of shield 57, and light responsive means 58 are located on the opposite side of the shield. Light responsive means 58 is preferably a resistor whose resistance decreases when it is exposed to light. As the shield 57 travels with the assembler slide, the resistor 58 is gradually exposed to a greater extent to the light produced by the source of light 59, so that its resistance gradually decreases and is a measure of the length of the line of assembled matrices.

A measuring instrument 60 measures the current flowing through light responsive resistor 58, the current being produced by a source of voltage 6. The indication of the instrument 60 is proportional to the length of the matrices assembled on the assembler slide, and consequently the dial of the instrument 60 may be graduated in typographical units.

If the indicator of FIGS. 5 and 5a is provided in the device of FIG. 1, the operator is informed by the indications of the instrument 60 when sufficient matrices and space bands are assembled to make the line justifiable, and when this condition is obtained while the record carrier tape and the escapement mechanism of the magazines are operated under manual control, the operator actuates elevator lever 50 shown in FIG. 4.

If only the device of FIGS. 5 and 5a is provided on the assembler slide, the operator manually activates switch 4 by the key schematically indicated in FIG. 2 when he considers the end of the line near enough to use manual control of the movement of the record carrier tape, as described with reference to FIG. 2. From the above description of FIGS. 1 and 2, it will be understood that although the record carrier tape is stepwise moved under manual control, the command signals for discharging matrices by the escapement mechanism shown in FIG. 3, are given under the control of sensing means sensing coded recordings on the record carrier. If no recording representing the end signal is provided on the record carrier tape in the correct position, actuator bar 31 remains inoperative, and the electromagnetic actuator 35 of FIG. 4 is not energized, so that manual operation of elevator lever 50, 48 is necessary. If the recording indicating the end of a line is provided in the correct position, then the electromagnetic actuator 35 is energized.

Record carrier tapes provided, for example, by news agencies, do not have recordings representing the end signal in the proper position for the composition of a particular newspaper. Therefore, manual actuation of the assembling elevator by elevator lever 50, 48 is necessary. However, the record carrier tape has recordings representing space bands following each complete word, and it is advantageous to use such recordings for producing the end signal for actuating the assembling elevator. Furthermore, it is necessary to add a hyphen if a word has to be divided at the end of the line whose last portion is assembled under manual control of the operator. The circuit portion B of the diagram of FIG. 6 illustrates how these and other results are obtained in accordance with the present invention. The circuit portion C of FIG. 6 corresponds to the circuit explained with reference to FIG. 2, and diagram part A shows the electric circuit of the device explained with reference to FIGS. 5 and 5a.

As shown in FIG. 6, the photo-responsive resistor 58 is connected into the branch 64 of a Wheatstone bridge. Another light-responsive resistor 66 is connected in series with a variable resistor 67 located in another branch 65. Resistor 66 serves the purpose to compensate the bridge and to eliminate the influence of undesired light, while resistor 57 is adjusted to balance the bridge.

In another branch 68, contacts 69 of a relay counter 70 are respectively connected in series with resistor 71. When the relay counter 70 is energized by successive impulses, contacts 69 are successively closed to that another contact 69 is closed after each energization of relay counter 70, and connects another resistor 71 into the branch 68. The return of relay counter 70 to its initial position, in which the first contact 69 is closed, is effected by energization of a clearing electromagnet 72.

In another branch 73, a manually operated stepping switch 74 has contacts respectively connected in series with resistors 75. The resistances of resistors 75 are respectively proportional to the expansibility or drive of different space bands so that the switch 74 is set for a particular space band type used. In contrast, resistors 71 have resistances proportionate to the number of impulses required for closing the respective associated contact 69.

In the last branch 76, a relay 77 is connected in series with a resistor 78 whose resistance is different in opposite directions of flow of the current.

As will be explained hereinafter in greater detail, the relay counter 70 is excited by an impulse whenever a space band is discharged from the magazine and suplied to the line being assembled in the assembler slide, so that each closed contact 69 and the associated resistor 71 through which current flows, represents a given number of already discharged space bands assembled on the assembler slide.

The bridge is compensated so that relay 77 is only effective when the expansibility or drive of the space band, represented by a resistor 75, of the number of assembled space bands, represented by resistors 71, is sufficient to fill the remaining portion of the line, represented by resistor 58 whose resistance varies as the same is gradually exposed during the assembly of the line of matrices to the light used by the light source 59.

When relay 77 is energized upon reaching of the justifiable condition of the assembled line of matrices and space bands, a contact 79 closes and connects a signal lamp 80 into the circuit by which the operator is warned that the assembled line is justifiable.

The justifiable completed line of matrices can be transported by the assembling elevator, and for this purpose, a switch 81 is operated by key 82. Actuator magnet 35, described with reference to FIG. 4 is connected in series with switch 81, a direction depending resistor 83, and the normally closed contact 84 which is actuated by an electromagnetic means 85 controlled by a contact 104 which is operated by matrices discharged by the magazines. It will be seen that manually operated switch 82, 81 can cause the actuation of the assembling elevator and the removal of the assembled line of matrices in the same manner as the manually operated elevator lever 50, 48. However, the circuit of switch 81, 82 is interrupted by the opened contact 84 of electromagnet 85 during discharge of a matrix. The clearing electromagnet 72 is connected in parallel with the electromagnetic actuator 35. When electromagnetic actuator 35 is energized upon closing of switch 81, 82, the clearing electromagnet 71 is also energized, and clears relay counter 70.

As explained with reference to FIG. 4, a contact 32 is automatically closed if a recording producing an end signal is provided in the record carrier tape. When the assembled matrices are justifiable, a contact 86 connected in series with contact 32 and located in conductor 34, is operated by relay 77 in branch 76 of the Wheatstone bridge, and closes over direction depending resistor 87 and contact 84, the circuit of actuator magnet 35 so that an end signal for actuating the assembling elevator, can only be produced if the signal indicating the justifiability of the assembled line has been given. In other words, only if signal lamp 80 indicates that the number and drive of the assembled space bands is sufficient to justify the line, relay 77 prepares the circuit of the electromagnetic actuator 35 to permit operation of the same under the control of a recording provided on the record carrier tape. In this manner, a recording representing an end signal, and being provided in the proper place, possibly only incidentally, may also cause the actuation of the assembling elevator.

When a recording representing a space band is sensed in the record carrier tape, a contact 88 is closed in the usual automatic operation described with reference to contact 32, key bars 30 and actuator bar 31 illustrated in FIG. 4. As long as the assembled line is not yet justifiable, contact 88 closes the circuit of the space band release magnet 92 which causes release of a space band from a magazine so that the space band is assembled on the assembler slide. Space band release magnet 92 corresponds to the electromagnet 22 shown in FIG. 3, but cooperates with the escapement mehanism of the magazine storing space bands, while electromagnet 22 may be considered to cooperate with the escapement mechanism of the magazine storing matrices of hyphens. The circuit of space band release magnet 92 is closed over a contact 89 of justification relay 77, and contact 90 of a relay 91, unless the latter is energized.

However, if a line has reached its justifiable condition, the justification relay 77 shifts contact 89 to its other position, and the circuit of the space band release magnet 92 cannot be completed. At the same time, contact 89 closes the circuit of the indicator lamp 93 which indicates, in addition to the justifiable condition indicated by signal lamp 80, also that the end of a word represented by a space band has been reached, so that the line may be justified at this moment.

The assembling elevator may now be actuated either by lever 48 or 50, or by key switch 82, 81 since the line is ready to be justified. However, it is possible to connect in parallel with signal lamp 93, a voltage depending resistor and to energize actuator 35 over contact 84.

Three parallel contacts 95, 96, 97 are operated in the same manner as described with reference to contact 32 when coded recordings representing the quadding justification commands "right," "left," "center" are sensed. Each of these contacts connects over resistor 83 and contact 84, electromagnetic actuator 35 into the circuit so that the assembling elevator is actuated.

A contact 98 is also operated in the same manner as contact 32 when a recording is sensed representing a "hyphen." The closed contact 98 is connected by a manually operated switch 99, 100 to the electromagnet 22, also shown in FIG. 3, which operates the escapement mechanism of the storage magazine storing matrices representing hyphens.

In the event that the record carrier tape has recordings representing a justified composition of a line which is not suitable for the composition required in the particular case, contact 100 is manually shifted by handle 99 so that the circuit of the hyphen release magnet 22 is interrupted, so that a hyphen, appearing at the end of a line having a wrong length, is ineffective. If necessary, contact 24 is manually closed by pushbutton 35 for discharging a matrix representing a hyphen since contact 24 is also connected in series with hyphen release magnet 22.

When contact 98 is actuated, relay 77 is connected by contact 100 and 101 into the circuit and energized. At the same time, relay 91 is energized over a normally closed contact 102 of a relay 103.

Whenever a matrix is discharged from a magazine, a contact 104 is closed in the standard line casting machine and produces an impulse acting on matrix control magnet 85 over a direction dependent resistor 105. Relay 91 operates its contact 107 so that locking magnet 9 is energized over a voltage depending resistor 106 and stops the automatic matrix setting operation, as described with reference to FIGS. 1 and 2.

A relay 108, connected in parallel with locking magnet means 9, is also energized and closes its holding contact 110 connected to a shiftable contact 109 which is operable by key 8. When contact 104 is again opened, locking magnet 9 remains energized. When key 8 is operated, the circuit of locking magnet 9 and of relay 108 is interrupted. Furthermore, a release winding of relay 91 is energized over the closed contact 109 and contact 111 of relay 91, so that relay 91 is de-energized, and the assembly of matrices can be continued.

If no command for discharging of a matrix, but a line end command is recorded following a recording representing a hyphen, not contact 104, but contact 32 is closed. Contact 32 energizes electromagnet 22, see also FIG. 3, over a direction dependent resistor 112 and contact 113, so that a hyphen matrix is discharged from the respective magazine.

An impulse is given over a direction dependent resistor 114 to the matrix control magnet 85 and over a direction depending resistor 115 and contact 111, the release winding of relay 91 is energized so that the relay is de-energized. After the discharged hyphen matrix has arrived through the chute at the assembler slide and actuates the matrix control magnet 85, contact 84 is closed by the same so that the electromagnetic actuator 35 can be energized to cause lifting of the assembling elevator with the assambled line of matrices.

If on the record carrier, the recording representing a space band follows a recording representing a hyphen, contact 88 is closed and relay 103 is energized over contacts 89 and 90 and operates the release magnet 22 for releasing a hyphen matrix from the magazine over its own contact 116 and the closed contact 113. At the same time, the release winding of relay 91 is energized over voltage depending resistor 115 and contact 111, so that relay 91 is de-energized. Contact 90 of relay 91 opens, and de-energizes relay 103 which holds itself for a short time until capacitor 117 has discharged. Thereafter, relay 103 is de-energized, closes its contact 118 and produces an impulse acting over capacitor 119 on relay 120 so that its relay contact 121 closes and energizes the space band release magnet 92, which operates the escapement mechanism as described with reference to FIG. 3 and the hyphen release magnet 22.

If a recording represents an end signal, but is not followed by a recording representing a hyphen, and if the line is not yet justifiable, contact 32 closes the circuit for the release magnet 92 for space bands over contact 86 and contact 90, so that a space band is released and no end signal causing removal of the assembled line by the assembling elevator is given. If contact 98 is only shortly closed, it is necessary that relay 91 holds itself by the holding contact 122. A signal lamp 123 is provided parallel to relay 91, and the resistor 124 serves to discharge capacitor 119 when contact 118 is opened.

A space band may be manually released by operation of a switch 125 having a key 126. Switch 125 is connected over contact 90 with release magnet 92 for space bands so that the same is energized and actuated by switch 125.

FIG. 7 illustrates an apparatus for sensing a record carrier 135 which is shown also in FIG. 7a. Light permeable dots 136, which may be transparent, also arranged in transverse rows on the record carrier tape 135, and the position and number of dots 136 follows a code so that each transverse row is a coded recording. Smaller holes are provided at the center line of the record carrier tape 135, and engaged by a transporting member which stepwise advances tape 135 in the usual manner.

The device of FIG. 7 serves the purpose of making the information represented by a predetermined number of recordings directly following the last sensed recording optically recognizable so that the information can be evaluated by the operator.

Under each row of transparent dots or holes 136, a light responsive resistor 135 is provided which is exposed to light by a source of light 138 producing light passing through holes 136. Each resistor controls a cold cathode relay 135. The anode of relay 135 is connected to a resistor 140, a signal lamp 141 and to a relay 142 which are connected in parallel. An alternating voltage is supplied to this circuit by a transformer 143, while a direct current voltage produced by a source 144 is applied over a resistor to the igniting electrode 145. The positive pole of the source 144 is connected to resistor 137. Whenever the alternating current of transformer 143 has a zero value, the relay 139 is again ignited when resistors 137 receive light through the holes 136 of record carrier tape 135 and permit the positive potential of the direct current voltage source 144 to be applied to the igniting electrode 145. Signal lamps 141 are arranged in a row corresponding to the coded holes of the recordings 136 in record carrier type 135, so that the coded hole combinations of the recording are optically recognizable. The purpose of relay 142 will be described hereinafter, and, for example, devices as will be explained hereinafter with reference to FIG. 11 can be actuated by relay 142.

An electromechanical sensing device is illustrated in FIG. 8. Sensing levers 150 have projections adapted to enter into the coded holes of the recordings 136 of record carrier tape 135. While record carrier tape 135 is stepwise transported, electromagnet 151 is energized to retract the sensing levers 150 to a position in which they do not engage the holes of the record carrier tape. Each sensing lever actuates a switch 152, and when levers 150 are released by the de-energized magnets 151 and center holes 136, the corresponding switches 152 are actuated by those sensing levers which find holes to enter in the particular combination of holes in the respective row. Switches 152 are respectively connected to signal lamps 141, as shown in FIG. 8a so that the same are illuminated in the same pattern as a coded recording. A source of voltage 6 is connected to switches 152 and signal lamps 141.

If devices as described with reference to FIG. 7 and FIG. 8 take up so much space that it is difficult to arrange them in positions to sense several successive rows of holes in the record carrier tape, a device as shown in FIG. 9 may be used which includes a storage device with a shifting register controlling the signal lamps 141. FIG. 9 shows a magnetic record carrier in the form of a magnetizable tape 156 which has a synchronizing track 157, and several recorded tracks representing coded information. Track 157 is read out by a transducer head 159, and transducer heads 160 read out the recorded tracks 158. Each transducer head is followed by an amplifier 161 and by an inverter 162 which reverses the information. The signals produced by the transducer head 160 respectively control shift register D which includes bistable switching elements 163 whose number corresponds to the number of coded informations to be indicated. Switching elements 163 are connected over "AND" gate 164 to the amplifiers 161, respectively and are stepwise shifted by the amplified impulses of the track 157. Amplifiers 165 follow the bistable switching elements 163, and if there is a coded information read out, the respective signal lamp 141 is illuminated.

Instead of controlling the entry into the shifting register by transducer heads under control of a magnetizable tape, the information may also be entered by actuated switches 152, as described with reference to FIG. 8.

Figure 10:
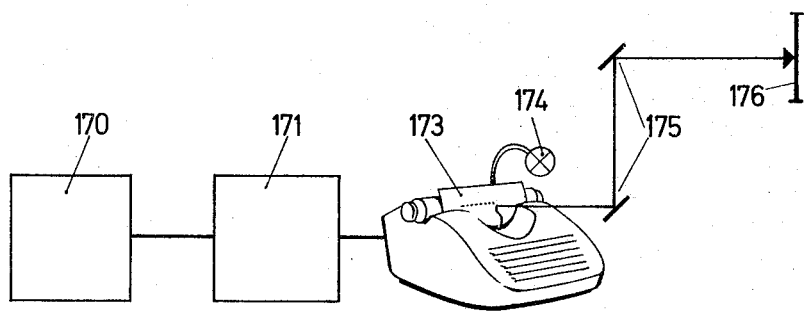
FIG. 10 is a schematic diagram illustrating a typewriter for optically and visually indicating decoded information before discharge of the matrices represented by the sensed recordings.

FIG. 10 schematically illustrates an apparatus for visually indicating in legible form the decoded information recorded on the record carrier. The coded information represented by recordings of the record carrier is read out by a read out device 170, and the coded information is supplied to a coding device 171 controlling a printer, such as automatic electric typewriter 172 which prints the information represented by recordings of the record carrier 135 on a paper strip 173. The text printed by typewriter 172 is scanned by source of light 174, and the reflected light passes over optical reflecting elements 175 to a frosted glass plate 176 where an enlarged image can be viewed by the operator.

Figure 11:
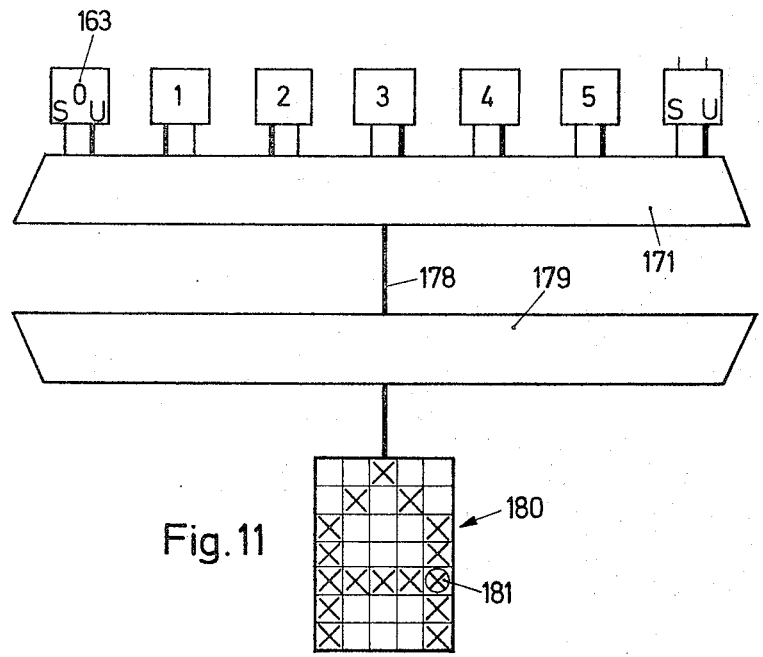
FIG. 11 is a diagrammatic view illustrating an optical indicator for visually representing decoded information represented by sensed recordings.

FIG. 11 illustrates schematically another indicator device for visually representing decoded information so that the operator can understand the meaning of the recordings following the recording sensed at any time, and initiate at the proper moment necessary operations, such as giving the end signal by which the assembled finished line is transferred by the assembling elevator, or causing the discharge of a hyphen matrix at the end of the line. The indicator device of FIG. 11 follows the bistable switching elements explained with reference to FIG. 9, so that the read out recordings are supplied to a decoding device 171 from which the decoded impulses are supplied to a coding device 179 controlling signal lamps 181 arranged in a plurality of transverse and longitudinal crossing rows in an optical indicator 180 so that the selected signal lamps 181 which are illuminated indicate the outline of a character or symbol represented by a recording on the record carrier.

It will be understood that each of the elements described above, or two or more together, may also find a useful application in other types of line casting machines differing from the types described above.

While the invention has been illustrated and described as embodied in an apparatus for partly automatically, and partly manually controlling the assembly of matrices and the removal of an assembled line in a line casting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for controlling a line casting machine comprising, in combination, control means including a record carrier having wrong recordings or no recordings for representing line end signals, and sensing means for sensing the recordings on said record carrier for controlling the line casting machine to automatically discharge matrices in accordance with sensed recordings; an assembling elevator having an assembler slide for receiving discharged matrices and being moved by the same to successive positions including a predeterminable intermediate position and an end position corresponding to a complete line of assembled matrices; switch means connected with said control means and actuated by said assembler slide in said predeterminable intermediate position to stop said control means; adjusting means associated with said switch means and said assembler slide for adjusting and thereby predetermining said intermediate position in which said assembler slide actuates said switch means to stop said control means; first manually controlled means for moving said record carrier beyond said intermediate position so that additional recordings are sensed and additional matrices discharged into said assembler slide; and second manually controlled means for starting operation of said assembling elevator when the recording representing the last character of a line determined by the operator has been sensed.

2. An apparatus according to claim 1 wherein said first manually controlled means include a key, and means controlled by said key for stepwise moving said record carrier beyond said intermediate position to said end position.

3. An apparatus according to claim 1 including magazines for matrices represented hyphens and space bands; and means for releasing said matrices from said magazines independently of said control means.

4. An apparatus according to claim 1 and including an indicator device for indicating the line length of the assembled matrices and space bands, if any.

5. An appartus according to claim 4 including means for producing a perceptable justification signal when the total line length of the assembled matrices and space bands plus the expansibility of the assembled space bands correspond to the predetermined line length.

6. An apparatus according to claim 5 including means receiving said justification signal and causing operation of said assembling elevator for the removal of an assembled line only after receiving said justification signal.

7. An apparatus according to claim 1 including means for producing a justification signal when the assembled matrices and space bands are justifiable; escapement means controlled by said sensing means for discharging space bands into said assembler slide; and means controlled by said justification signal and controlling said escapement means to prevent discharge of a space band to cause an end signal when receiving said justification signal.

8. An appartus according to claim 7 including means connected with said assembling elevator for actuating the same to transport said slide with a complete line of assembled matrices; and means responsive to a recording representing a space band and being controlled by said justification signal to actuate said first mentioned means.

9. An apparatus according to claim 1 including means for preventing discharge of a matrix representing a hyphen into said assembler slide under the control of said sensing means; and manually operable means for discharging a hyphen matrix into said assembler slide.

10. An apparatus according to claim 1 and including means responsive to a recording on said record carrier representing a hyphen, and connected with said control means for stopping the sensing of the record carrier when responding to a recording representing a hyphen.

11. An apparatus according to claim 1 including means controlled by said sensing means and responding to a recording representing a hyphen to cause the discharge of the corresponding matrix only if said hyphen representing recording is directly followed by a recording representing an end signal.

12. An apparatus according to claim 1 and including means for discharging a hyphen representing matrix into said assembler slide, and means responsive to a hyphen representing recording and to a directly following space band recording to cause the discharge of a hyphen matrix before the discharge of a space band.

13. An apparatus according to claim 12 and including a storage device for storing signals representing hyphen recordings, and means for discharging a space band matrix and controlled by a recording representing an end signal if no hyphen signal is stored in the storage device.

14. An apparatus according to claim 13 wherein said storage device is adapted to store a justification signal; means for producing a justification signal; and means for causing the discharge of a space band matrix only when said storage device does not store said justification signal.

15. An apparatus according to claim 1 and including other sensing means for sensing recordings following the recordings sensed by said first mentioned sensing means; and indicator means for indicating the information represented by the recordings sensed by said other sensing means.

16. An apparatus according to claim 15 and including storing means for storing the signals produced by said other sensing means.

17. An apparatus as set forth in claim 16 and including means for decoding the stored information, and means for visually indicating the decoded information.

18. An apparatus according to claim 1 and including means responsive to a recording representing a quadding signal, said means being connected with said assembling elevator for actuating the same to transport said assembler slide with a line of assembled matrices when a quadding signal occurs.

19. A method for controlling a line casting machine by a record carrier having wrong recordings, or no recordings for representing line end signals, comprising automatically driving the record carrier; automatically sensing spaced recordings of said record carrier and automatically controlling the release and assembly of matrices and space bands by the line casting machine accordingly; automatically stopping the record carrier when the end of the assembled series of matrices and space bands, if any, is located at a selected distance from the end of a predetermined line length; adjusting said selected distance at which the assembled series of matrices and space bands is located from the end of a predetermined line length when said record carrier is automatically stopped; manually controlling the record carrier to move stepwise and thereby controlling the line casting machine to continue assembling operations; and manually producing after reaching a possible line end, an end signal causing the delivery of the assembled line.

20. A method according to claim 19 and including manually causing the release of a matrix representing a hyphen when the possible line end does not occur at the end of a word.

21. A method according to claim 19 including determining the justifiability of a line of matrices and space bands, if any, under the control of said recordings by comparing the difference of the length of the line composed of the assembled matrices and space bands and the predetermined line length at their minimum width with the drive of the assembled space bands.

22. A method according to claim 21 including rendering ineffective a recording representing the end of the assembled line before the assembled line is justifiable.

23. A method according to claim 21 and including causing an end signal when a recording representing a space band is sensed after the assembled line has been determined to be justifiable.

24. A method according to claim 23 and including automatically transforming a recording representing a space band into an end signal after the line has become justifiable.

25. A method according to claim 21 wherein recordings on said record carrier represent wrong end signals; and including automatically rendering ineffective a recording representing a word dividing hyphen before the assembled line of matrices and space bands have become justifiable.

26. A method according to claim 21 wherein recordings on said record carrier represent wrong end signals; and including preventing release of a hyphen-representing matrix whose recording is directly followed by a recording representing an end signal for causing termination of the assembly of matrices in the respective line before the assembled line of matrices has become justifiable.

27. A method according to claim 19 wherein recordings on said record carrier represent wrong end signals; and wherein a recording representing the end signals and sensed before the assembled line of matrices has become justifiable, causes a signal for the release of a space band if not preceded by a recording representing a word dividing hyphen.

28. A method according to claim 27 and including determination of the justifiability of the assembled line, and preventing the release of a space band by a recording representing an end signal after the line has become justifiable.

29. A method according to claim 19 and including optically indicating information represented by recordings following the last sensed recording on the record carrier.

30. A method according to claim 29 wherein the optically indicated information is represented in decoded form.

31. A method according to claim 19 wherein a recording representing a quadding signal additionally causes the delivery of the assembled line.

32. A method for controlling a line casting machine by a record carrier, comprising driving the record carrier; sensing spaced recordings of said record carrier and controlling the release of matrices and space bands by the line casting machine accordingly; stopping the record carrier when the end of the assembled series of matrices and space bands, if any, is located a selected distance from the end of a predetermined line length; manually controlling the record carrier to move stepwise so that additional recordings are sensed; determining the justifiability of the line of matrices assembled under the control of said recordings; causing an end signal when a recording representing a space band is sensed after the assembled line has been determined to be justifiable; and automatically transforming a recording representing a justification command into an end signal after the line has become justifiable.

33. A method for controlling a line casting machine by a record carrier, comprising driving the record carrier; sensing spaced recordings of said record carrier and controlling the release of matrices and space bands by the line casting machine accordingly; stopping the record carrier when the end of the assembled series of matrices and space bands, if any, is located a selected distance from the end of a predetermined line length; manually controlling the record carrier to move stepwise so that additional recordings are sensed; determining the justifiability of the line of matrices assembled under the control of said recordings; causing an end signal when a recording representing a space band is sensed after the assembled line has been determined to be justifiable; and automatically rendering ineffective a recording representing a word dividing hyphen before the assembled line of matrices has become justifiable.

34. A method for controlling a line casting machine by a record carrier, comprising driving the record carrier; sensing spaced recordings of said record carrier and controlling the release of matrices and space bands by the line casting machine accordingly; stopping the record carrier when the end of the assembled series of matrices and space bands, if any, is located a selected distance from the end of a predetermined line length; manually controlling the record carrier to move stepwise so that additional recordings are sensed; manually causing an end signal representing the end of the assembly of the respective line; and causing a signal for the release and assembly of a space band by a recording representing an end signal unless said last mentioned recording is preceded by a recording representing a word dividing hyphen.

35. A method according to claim 34 and including determination of the justifiability of the assembled line and preventing the release of a space band by a recording representing an end signal after the line has become justifiable.

36. A method for controlling a line casting machine by a record carrier, comprising driving the record carrier; sensing spaced recordings of said record carrier and controlling the release of matrices and space bands by the line casting machine accordingly; stopping the record carrier when the end of the assembled series of matrices and space bands, if any, is located a selected distance from the end of a predetermined line length; manually controlling the record carrier to move stepwise so that additional recordings are sensed; optically indicating information represented by recordings following the last sensed recording on the record carrier; and causing an end signal representing the end of the line when a line of a predetermined length has been assembled.

37. A method according to claim 36 wherein the optically indicated information is represented in decoded form.

References Cited by the Examiner
UNITED STATES PATENTS

| | | | |
|---|---|---|---|
| 1,970,566 | 8/1934 | Kleinschmidt | 199—26 X |
| 2,924,327 | 2/1960 | Heimel | 199—18 |
| 3,209,901 | 10/1965 | Krause et al. | 199—18 |

ROBERT E. PULFREY, *Primary Examiner.*

WILLIAM F. McCARTHY, JR., *Assistant Examiner.*